(12) United States Patent
Taniyama et al.

(10) Patent No.: US 9,115,029 B2
(45) Date of Patent: Aug. 25, 2015

(54) THERMAL INSULATING FIREBRICK

(75) Inventors: Daisuke Taniyama, Nanao (JP); Yasunari Nagasaki, Nanao (JP); Akira Terasawa, Nanao (JP)

(73) Assignee: HINOMARU YOGYO CO., LTD., Tokyo (JP)

( * ) Notice: Subject to any disclaimer, the term of this patent is extended or adjusted under 35 U.S.C. 154(b) by 0 days.

(21) Appl. No.: 14/124,897

(22) PCT Filed: Jun. 4, 2012

(86) PCT No.: PCT/JP2012/003656
§ 371 (c)(1),
(2), (4) Date: Dec. 9, 2013

(87) PCT Pub. No.: WO2012/169170
PCT Pub. Date: Dec. 13, 2012

(65) Prior Publication Data
US 2014/0128242 A1 May 8, 2014

(30) Foreign Application Priority Data

Jun. 10, 2011 (JP) .................................. 2011-130170

(51) Int. Cl.
*C04B 38/00* (2006.01)
*C04B 38/10* (2006.01)
(Continued)

(52) U.S. Cl.
CPC ............... *C04B 35/10* (2013.01); *C04B 35/101* (2013.01); *C04B 35/6303* (2013.01);
(Continued)

(58) Field of Classification Search
CPC .................. C04B 2111/00793; C04B 38/00; C04B 38/009; C04B 38/065; C04B 38/0615; C04B 38/0675; C04B 38/0635; C04B 38/02; C04B 38/10; C04B 18/027; C04B 20/06
USPC .............................. 501/80, 81, 82, 83, 84, 85
See application file for complete search history.

(56) References Cited

U.S. PATENT DOCUMENTS 2,588,646 A * 3/1952 Miller et al. .................... 501/84
3,232,772 A    2/1966 Hilton et al.
(Continued)

FOREIGN PATENT DOCUMENTS

DE    41 02 430 A1    7/1992
JP    9 157066    6/1997
(Continued)

OTHER PUBLICATIONS

Taikabutsu Techo, "Refractory Pocketbook '81" The Technical Association of Refractories, pp. 57-59, (Oct. 1982) (with partial English translation ).
(Continued)

*Primary Examiner* — Noah Wiese
(74) *Attorney, Agent, or Firm* — Oblon, McClelland, Maier & Neustadt, L.L.P.

(57) ABSTRACT

An object of the invention is to provide, in porous thermal insulating firebricks formed by molding and drying bubble-containing slurry obtained by foaming slurry containing a fire resistant powder and water, a thermal insulating firebrick superior in thermal insulating property in spite of the same composition and porosity.
A porous thermal insulating firebrick formed by molding and drying bubble-containing slurry obtained by foaming slurry containing a fire resistant powder with a heat resistant temperature of 1,000° C. or higher and water has the porosity of 60% or more, and 80% or more volume with respect to a total pore volume of the inside of the thermal insulating firebrick consists of pores having a pore size of 200 μm or less.

8 Claims, 6 Drawing Sheets

(51) Int. Cl.
*C04B 35/10* (2006.01)
*C04B 35/101* (2006.01)
*C04B 35/63* (2006.01)
*F27D 1/00* (2006.01)

(52) U.S. Cl.
CPC ............... *C04B 38/10* (2013.01); *F27D 1/003* (2013.01); *F27D 1/0006* (2013.01); *C04B 2235/3201* (2013.01); *C04B 2235/3427* (2013.01); *C04B 2235/3463* (2013.01); *C04B 2235/5427* (2013.01); *C04B 2235/5436* (2013.01); *C04B 2235/5472* (2013.01); *C04B 2235/606* (2013.01); *C04B 2235/96* (2013.01); *C04B 2235/9607* (2013.01)

(56) References Cited

U.S. PATENT DOCUMENTS

| | | | | |
|---|---|---|---|---|
| 3,641,229 | A * | 2/1972 | Lawrence et al. | 264/43 |
| 4,248,637 | A * | 2/1981 | Mathieu | 501/80 |
| 6,808,663 | B2 * | 10/2004 | Noguchi et al. | 264/44 |
| 2008/0312064 | A1 * | 12/2008 | His et al. | 501/84 |
| 2009/0069167 | A1 * | 3/2009 | Tardivat et al. | 501/84 |
| 2009/0169848 | A1 * | 7/2009 | Komiyama et al. | 428/219 |

FOREIGN PATENT DOCUMENTS

| | | |
|---|---|---|
| JP | 2003 112256 | 4/2003 |
| JP | 2007 290893 | 11/2007 |
| JP | 2010 168272 | 8/2010 |
| JP | 2010 235414 | 10/2010 |

OTHER PUBLICATIONS

"Guide Book to the Ceramic Engineering", The Ceramic Society of Japan, pp. 1734-1742, (Apr. 10, 1989) (with partial English translation).

Atarashii Yoro to Sono Taikabutsu, "The New Industrial Klin and the Refractory", The Technical Association of Refractories, pp. 89-90, (Feb. 1, 1973).

Written Opinion of the International Searching Authority in PCT/JP12/003656 Issued May 21, 2013 (with partial English translation).

International Search Report Issued Aug. 28, 2012 in PCT/JP12/003656 Filed Jun. 4, 2012.

Extended European Search Report issued Mar. 25, 2015 in Patent Application No. 12797455.8.

* cited by examiner

THERMAL INSULATING FIREBRICK

TECHNICAL FIELD

The present invention relates to a thermal insulating firebrick. Specifically, the invention relates to a porous thermal insulating firebrick formed by molding and drying bubble-containing slurry obtained by foaming slurry containing a fire resistant powder and water.

BACKGROUND ART

A thermal insulating firebrick (ceramic porous body) is a porous lightweight refractory to which not only fire resistance but also thermal insulating property are imparted by forming a lot of bubbles inside a fire resistant material. A thermal insulating firebrick is used independently for a heating surface (for example, inner surface of a furnace) in some cases, and is used in combination with another fire resistant material as lining in other cases.

Hitherto, various production techniques for forming bubbles inside a fire resistant material have been established. For example, a technique in which pores are obtained by destroying combustibles by fire after molding and drying slurry containing a fire resistant powder such as ceramic powder, combustibles, and water, and a technique in which pores are obtained by blowing air or gas into slurry containing a fire resistant powder and water or generating gas inside slurry mixed with a gas generating material have been known.

In addition, production of a porous thermal insulating firebrick is also performed using a raw material originally having a high porosity, for example, such as diatomaceous earth, pearlite, and vermiculite as a main raw material. Among these, since a lot of fine pores are present in diatomaceous earth, a thermal insulating firebrick using diatomaceous earth as a main raw material is widely diffused as an excellent thermal insulating firebrick with a low thermal conductivity. However, diatomaceous earth cannot be used in a high temperature range exceeding 1,000° C. since the heat resistant temperature thereof is about 1,000° C. Therefore, in order to cope with use in a high temperature range exceeding 1,000° C., a production technique for producing a porous thermal insulating firebrick using a raw material excellent in heat resistance as a main raw material has been practically applied.

In Patent Literature 1, a porous molded body in which pores are contained in slurry containing ceramic powder and water, and a method for producing the porous molded body are disclosed. The porous molded body disclosed in Patent Literature 1 is produced in such a manner that slurry containing ceramic powder and water is stirred to form bubbles, the content and pore size of the bubbles (pores) in the slurry is adjusted by controlling stirring, and then the slurry is dried for solidification. This porous molded body is characterized in that the pore size inside the porous molded body is 1 mm or less and the porosity thereof is 60% or more, the pores are approximately homogenously distributed inside the porous molded body, and the shape of the porous molded body is imparted according to the purpose.

Since the porous molded body disclosed in Patent Literature 1 is a low density and high quality porous molded body including pores with a controlled pore size and distribution, the porous molded body can be preferably used for various purposes such as a lightweight constructional material, a thermal insulating material, a soundproof material, a seismic isolation material, a filter, a sensor, a catalyst support, and a biomaterial. However, the main object of the invention disclosed in Patent Literature 1 is to use the porous molded body as a filter or the like in which fluid passes through the pores. Accordingly, the following description is disclosed in Patent Literature 1. The technical meaning that a pore size inside a porous molded body is 1 mm or less and the porosity thereof is 60% or more is that properties of the porous molded body, such as fluid permeability, liquid absorbency, liquid storage property, and gas adsorptivity, are combined in a good balance. Controlling the pore size means that the properties (permeability coefficient of fluid, capillarity, specific surface area, and the like) of a porous member attributing to the pore size can be arbitrarily controlled.

PRIOR ART DOCUMENTS

Patent Literature

Patent Literature No. 1: Japanese Unexamined Patent Publication (KOKAI) Gazette No. 2007-290893 A

SUMMARY OF THE INVENTION

Problem to be Solved by the Invention

As a method for producing a porous thermal insulating firebrick, the above described technique in which pores are obtained by destroying the combustibles in slurry by fire may cause a defect such as internal cracks by temperature rise due to combustion gas and heat generated during the combustion of the combustibles inside bricks. In addition, this phenomenon more easily occurs as the addition amount of the combustibles in slurry increases. Therefore, in this technique, it is difficult to produce a thermal insulating firebrick that has a high porosity and is excellent in thermal insulating property. Further, since the particle size of the combustibles as a pore material itself becomes the pore size, fine combustibles are necessary for forming fine pores. However, inexpensive and proper materials as fine combustibles are not present.

In addition, with regard to the above described technique in which pores are contained in slurry by blowing air or gas into the slurry, a lot of investigations have been conducted. However, since it is difficult to stably retain fine bubbles, a production technique for mass production has not yet been established.

Although the porous molded body described in Patent Literature 1 is mainly used as a filter or the like, the fine pores with a pore size of 1 mm or less are stably retained in the porous molded body. Accordingly, by further developing the invention disclosed in Patent Literature 1, it is possible to obtain a porous molded body having pores suitable for a thermal insulating firebrick and to establish a method for producing the same.

The invention is achieved in view of such circumstances, and an object of the invention is to provide, in porous thermal insulating firebricks formed by molding and drying bubble-containing slurry obtained by foaming slurry containing a fire resistant powder and water, a thermal insulating firebrick superior in thermal insulating property in spite of the same composition and porosity.

Means for Solving Problem

Hereinafter, each means suitable for solving the above described problems will be described along with appending effects thereof as necessary.

(1) A thermal insulating firebrick according to the invention is a porous thermal insulating firebrick formed by molding and drying bubble-containing slurry obtained by foaming slurry containing a fire resistant powder with a heat resistant temperature of 1,000° C. or higher and water, in which the porosity of the thermal insulating firebrick is 60% or more, and 80% or more volume with respect to a total pore volume of the inside of the thermal insulating firebrick consists of pores having a pore size of 200 µm or less.

Here, the term "pore size" corresponds to a pore size measured by mercury porosimetry. In addition, the term "total pore volume" corresponds to a total volume of all of the pores included in a thermal insulating firebrick. The total pore volume can be calculated from the relation between the true specific gravity and the bulk specific gravity.

Thermal insulating firebricks having the same composition and porosity each have the same bulk specific gravity. In addition, the inventers have found that even though the bulk specific gravities of respective thermal insulating firebricks are the same as each other, if the pore size and distribution of the pores included in each of the thermal insulating firebricks are different from each other, each of the thermal insulating firebricks has a different thermal insulating property. Here, the inventers have achieved the invention based on the idea that, in the same porosity, the thermal conductivity of a thermal insulating firebrick decreases as the pore size thereof decreases.

According to the configuration of the invention, 80% or more volume with respect to the total pore volume of the inside of the thermal insulating firebrick consists of pores with a pore size of 200 µm or less. Therefore, by containing a lot of fine pores with a pore size of 200 µm or less, the thermal insulating firebrick of the invention is superior in thermal insulating property when the thermal insulating firebricks having the same composition and porosity are compared with each other.

In addition, a thermal insulating firebrick that is usable in a high temperature range and has fire resistance may be obtained by using a fire resistant powder with a heat resistant temperature of 1,000° C. or higher as a main raw material.

Furthermore, in the invention, if a necessary desired strength is obtained by drying bubble-containing slurry and there is no problem for use, burning after drying bubble-containing slurry may not be performed.

(2) In the thermal insulating firebrick according to the invention described in (1), the fire resistant powder is preferably composed of a raw material including at least one kind selected from a group consisting of alumina, mullite, andalusite, kyanite, cordierite, spinel, magnesia, and zirconia.

Alumina, mullite, andalusite, kyanite, cordierite, spinel, magnesia, and zirconia are raw materials for a refractory used in a high temperature range exceeding 1,000° C. Therefore, as in the configuration according to the invention, a thermal insulating firebrick that is usable in a high temperature range and has fire resistance may be obtained using a fire resistant powder composed of these raw materials.

Since all of these raw materials originally exhibit a high thermal conductivity, in order to produce a thermal insulating firebrick excellent in thermal insulating property, the thermal conductivity of the thermal insulating firebrick needs to be reduced by sufficiently increasing the porosity thereof. Furthermore, as in the invention, by containing a lot of fine pores with a pore size of 200 µm or less in the thermal insulating firebrick, it is possible to further reduce thermal conductivity in the same porosity.

(3) In the thermal insulating firebrick according to the invention described in (2), only high purity alumina powder having a purity of 99% or higher may be used as the fire resistant powder, and a bulk specific gravity of the thermal insulating firebrick may be 1.2 or lower.

In the thermal insulating firebrick according to the invention using only high purity alumina powder having a purity of 99% or higher as a fire resistant powder, the porosity thereof can be increased until the bulk specific gravity thereof decreases by half and properties of a light weight and a low thermal conductivity are obtained when compared to a thermal insulating firebrick produced by press molding hollow alumina particles of the related art.

Alumina has various excellent properties such as mechanical strength, heat resistance, electrical insulating property, chemical stability, and chemical resistance, and is relatively inexpensive. Therefore, alumina is the most-used ceramics in various fields. As in the configuration according to the invention, a thermal insulating firebrick having the alumina content of 99% or more has the above described excellent properties of alumina in addition to fire resistance and thermal insulating property, and is expected to be applied to various use environments.

(4) In the thermal insulating firebrick according to the invention described in (1) to (3), the slurry may include at least one of alumina cement, hydraulic alumina, and calcined gypsum.

By further including one of alumina cement, hydraulic alumina, and calcined gypsum in the slurry containing a fire resistant powder and water, strength by a hydration reaction is exhibited, and as a result, disappearance of fine bubbles inside of the bubble-containing slurry is prevented and a molded body strength necessary for the production process of a thermal insulating firebrick is obtained.

Effect of the Invention

According to the invention, it is possible to provide, in porous thermal insulating firebricks formed by molding and drying bubble-containing slurry obtained by foaming slurry containing a fire resistant powder and water, a thermal insulating firebrick superior in thermal insulating property in spite of the same composition and porosity.

BEST MODE(S) FOR CARRYING OUT THE INVENTION

Figure 1:
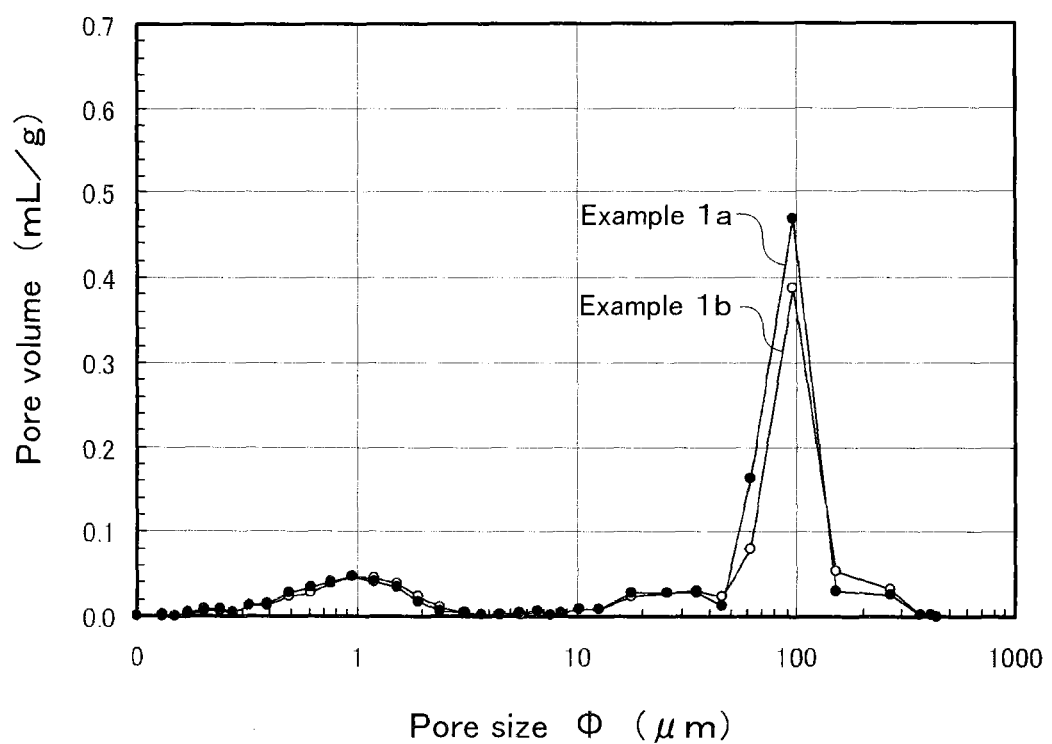
FIG. 1 is a result of the pore size measurement for Example 1 (1a and 1b), and shows a pore-size distribution curve.

A thermal insulating firebrick according to the invention is formed by molding and drying bubble-containing slurry obtained by foaming slurry containing a fire resistant powder with a heat resistant temperature of 1,000° C. or higher and water, and an auxiliary is added to the slurry as necessary. Hereinafter, an exemplary embodiment of the invention will be described.

As the fire resistant powder with a heat resistant temperature of 1,000° C. or higher, which is a main raw material of the thermal insulating firebrick, for example, oxide-based inorganic materials such as alumina, mullite, andalusite, kyanite, cordierite, spinel, magnesia, zirconia, titania, silica, and calcia, and mixtures of these may be used as the raw material. Among these raw materials, andalusite and kyanite are high-alumina natural minerals, and the others are industrial products (ceramics). Among these raw materials, alumina, mullite, andalusite, and kyanite are particularly preferably used. However, the main raw material is not limited to these materials, and a raw material that is equal or similar to these materials may also be used.

The particle size, particle size distribution, and compositional proportion of the pulverulent body (powder) in the slurry, and the kind and addition amount of the auxiliary added in the slurry may be arbitrarily designed. In addition, as necessary, a substance, which reacts with water to be hardened, such as alumina cement, hydraulic alumina, and calcined gypsum may be added in the slurry.

A porous thermal insulating firebrick is produced by introducing a large amount of bubbles into the slurry, and by performing molding and drying the bubble-containing slurry while retaining the bubbles. In order to perform this operation, an auxiliary for imparting foaming property and foam stability (property of which bubbles do not collapse or disappear) is added in the slurry.

As an auxiliary having a foaming component, for example, a surfactant used for a detergent, such as sodium alkyl sulfate, sodium polyoxyethylene alkyl ether sulfate, polyoxyethylene octylphenyl ether, sodium lauryl sulfate, sodium lauroylsarcosin, and sodium lauroyl methyl alanine may be used. In addition thereto, a material exhibiting an effect of lowering surface tension such as polyvinyl alcohol, or the like may be used.

When an auxiliary having a foam stabilizing component is added in the slurry, the disappearance of fine bubbles can be suppressed and the amount of bubbles in the slurry can be maintained. As such an auxiliary, for example, a cellulose-based thickener such as carboxymethyl cellulose, hydroxyethyl cellulose, and methyl cellulose may be used.

Further, in order to improve foam stability, an auxiliary having a water retentive component may be added in the slurry. The water retentive component holds water inside the slurry and suppresses weakening of the wall of a bubble. Therefore, the water retentive component exhibits an effect of improving foam stability. As such an auxiliary, for example, sugars such as granulated sugar, saccharose, fructose, and glucose may be used.

By concurrently using the auxiliaries described above, it is possible that the slurry has both the foaming property and foam stability. Furthermore, as an auxiliary, water glass may be added in order to adjust the viscosity of the bubble-containing slurry or calcined gypsum may be added in order to promote hardening of the bubble-containing slurry.

A stirrer is preferably used for the introduction of bubbles into the slurry. With regard to a method for foaming by a stirrer, by cutting bubbles mixed in the slurry into small pieces, slurry having fine bubbles may be obtained. With regard to the stirring method, since an optimum method is different for each of the stirrers used, an optimum stirring method is preferably determined according to a test or the like. For example, in a case in which the slurry is stirred using a whipper, stirring is performed as follows. First, slurry having proper viscosity is prepared by adding auxiliaries and kneading water while stirring the main raw material at a low speed so as not to overflow from the container. Next, outside air is taken into the slurry along with gradually increasing the stirring speed and the mixture is stirred so as to be sheared. Then, the bubbles are cut for micronizing the bubbles, and this operation is repeated until a predetermined volume of the slurry is obtained. After obtaining a predetermined volume of the slurry, the stirring speed is returned to the low speed to float the bubbles having a large pore size to the surface of the slurry and then the floated bubbles are removed.

Furthermore, the invention is not intended to be limited to the exemplary embodiment described above, and various modifications can be made within a range not departing from the gist of the invention. The effect of the invention will be described on the basis of Examples described below.

EXAMPLES

As Examples of the invention, a specimen of a thermal insulating firebrick, in which the porosity thereof is 60% or more, and 80% or more volume with respect to a total pore volume consists of pores with a pore size of 200 μm or less, was prepared and properties were evaluated. Examples 1 to 3 are examples in which high purity alumina powder having a purity of 99% or higher was used as a fire resistant powder, and Examples 4 and 5 are examples in which a powder converted to mullite by burning was used as a fire resistant powder. Further, the composition of the thermal insulating firebrick according to the invention is not limited to the following Examples.

Example 1

The composition of the specimen for Example 1 is shown in Table 1. The fire resistant powder as the main raw material of the specimen for Example 1 consists of four kinds of high purity alumina powders ($Al_2O_3$) having a purity of 99% or higher that are ceramic powders. For auxiliaries, polyvinyl alcohol (PVA) and sodium polyoxyethylene alkyl ether sulfate (AES) are used as foaming components, methyl cellulose (MC) is used as a foam stabilizing component, granulated sugar is used as a water retentive component, and water glass is used as a viscosity adjusting component. As Example 1, two specimens (Examples 1a and 1b) having the same composition were prepared by the same production method.

TABLE 1

| [Example 1] (Examples 1a and 1b) | | Compositional proportion (parts by weight) |
|---|---|---|
| Main raw material | Alumina (1) | 45 |
| | Alumina (2) | 10 |
| | Alumina (3) | 25 |
| | Alumina (4) | 20 |
| Auxiliary | 10% Aqueous solution of PVA (saponification degree: 98 to 99 mol %, viscosity: 25 to 30 mPa·s) | 1.0 |
| | MC (methoxyl group = 27.9%, hydroxypropolycyl group = 6.2%, viscosity: | 0.3 |

TABLE 1-continued

| [Example 1] (Examples 1a and 1b) | Compositional proportion (parts by weight) |
|---|---|
| 14,900 mPa · s) | |
| Granulated sugar | 3.0 |
| Water glass (sodium silicate) No. 3 | 0.06 |
| Surfactant (AES) | 0.06 |
| Kneading water | 45 |

Remark
Alumina (1): $Al_2O_3$ = 99.6%, Average particle size = 4 μm
Alumina (2): $Al_2O_3$ = 99.3%, 89% passed through 1 μm
Alumina (3): $Al_2O_3$ = 99.6%, Average particle size = 1 μm
Alumina (4): $Al_2O_3$ = 99.7%, Central particle size = 15 μm The production procedure of the specimen of the thermal insulating firebrick according to Example 1 is as follows.

[Procedure 1] MC and granulated sugar are sufficiently stirred and dissolved in hot water of 75° C.

Water is added thereto and cooled down, and then PVA and AES are added thereto and mixed with each other.

[Procedure 2] To the main raw material weighted in advance, the mixture prepared in [Procedure 1] is added, water glass is added, and then the slurry is stirred using a whipper (capacity: 60 L, motor capacity: 2.2 kW).

Stirring for 1 minute and 30 seconds at first gear (98 rpm) is performed.

Thereafter, stirring for 1 minute and 30 seconds at second gear (187 rpm) is performed.

Thereafter, stirring for 2 minutes at fourth gear (333 rpm), foaming the slurry is performed.

[Procedure 3] The slurry is sufficiently stirred and foaming is performed until the predetermined volume is obtained, and then the resultant slurry is stirred for 1 minute and 30 seconds at first gear to remove bubbles having a large pore size, whereby, the slurry is in a homogeneous and smooth state.

[Procedure 4] This slurry is cast in a mold.

[Procedure 5] This slurry is cured at a facility maintained at 20° C. or higher for 12 hours or longer.

[Procedure 6] The molded body cured in the mold is taken out of the mold, and dried for 24 hours at 25 to 35° C., and then for 96 hours at 45° C.

[Procedure 7] After completion of drying, the molded body is burned at 1,400° C.

Example 2

The specimen of Example 2 is an example of a specimen having the same composition as the specimen of Example 1 and having smaller porosity (bulk specific gravity is large) than Example 1. The production procedure of the specimen of Example 2 is the same as Example 1 except that the stirring time in the [Procedure 3] is shorter than Example 1.

Example 3

The specimen of Example 3 is an example of a specimen having the same composition as the specimen of Example 1 and having smaller porosity (bulk specific gravity is larger) than Examples 1 and 2. The production procedure of the specimen of Example 3 is the same as Example 1 except that the stirring time in the [Procedure 3] is shorter than Examples 1 and 2.

Comparative Example 1

The specimen of Comparative Example 1 uses the same main raw material as the specimen of Example 1. In Comparative Example 1, the specimen of the thermal insulating firebrick is molded by adding only water without adding the auxiliaries of Example 1. The porosity of the specimen of the thermal insulating firebrick according to Comparative Example 1 is 54.7%.

Comparative Example 2

The specimen of Comparative Example 2 uses the same main raw material as the specimen of Example 1. In Comparative Example 2, pores are formed inside the specimen of the thermal insulating firebrick by adding expanded polystyrene beads (EPS) having a particle size of 1 to 2 mm instead of adding the auxiliary of Example 1.

Quality and Properties

The quality and properties of the specimens of the thermal insulating firebricks according to Examples 1 to 3 and Comparative Examples 1 and 2 prepared in these manners are shown in Table 2. In Table 2, the bulk specific gravity was obtained from a specimen of a standard size (230×114×65 mm). Porosity is a proportion (%) of the pore volume with respect to the total volume of a specimen, and was obtained by a formula for computation of "porosity=(1-bulk specific gravity/true specific gravity)×100" from the relation between the true specific gravity and the bulk specific gravity. The measurement of the pore size was performed by mercury porosimetry (JIS R1655). Respective tests other than the above described tests were performed according to the testing method of a thermal insulating firebrick prescribed in JIS as follows: compressive strength (JIS R2615), reheat shrinkage (JIS R2613), thermal conductivity (JIS R2616 hot-wire method), rate of linear change on heating (JIS R2617). Further, in Table 2, the space for the items that are not subjected to the test is left as vacant.

As shown in Table 2, the bulk specific gravities of the specimens of Examples 1a, 1b, 2, and 3, and Comparative Examples 1 and 2 were 0.69, 0.73, 0.77, 1.00, 1.79, and 0.92 in this order. In addition, the porosities of the specimens of Examples 1a, 1b, 2, and 3, and Comparative Examples 1 and 2 were 82.5%, 81.5%, 80.5%, 74.7%, 54.7%, and 76.7% in this order.

TABLE 2

|  |  | Example 1 | | |
|---|---|---|---|---|
|  |  | Example 1a | Example 1b | Example 2 |
| Bulk specific gravity | | 0.69 | 0.73 | 0.77 |
| Porosity (%) | | 82.5 | 81.5 | 80.5 |
| Compressive strength (MPa) | | 2.6 | 2.1 | |
| Reheat shrinkage (%) at 1400° C. | | 0.5 | | |
| Thermal conductivity (W/m · K) | at 200° C. | 0.44 | | 0.64 |
| | at 350° C. | 0.32 | | 0.50 |
| | at 600° C. | 0.30 | | 0.42 |
| | at 800° C. | 0.29 | | 0.40 |
| | at 1000° C. | 0.29 | | 0.40 |
| Rate of linear change on heating (%) at 1000° C. | | 0.8 | | |
| Average pore size (μm), mercury porosimetry | | 2.2 | 2.2 | |

TABLE 2-continued

|  |  | Example 3 | Comparative Example 1 | Comparative Example 2 |
|---|---|---|---|---|
| Bulk specific gravity |  | 1.00 | 1.79 | 0.92 |
| Porosity (%) |  | 74.7 | 54.7 | 76.7 |
| Compressive strength (MPa) |  |  |  |  |
| Reheat shrinkage (%) at 1400° C. |  |  |  |  |
| Thermal conductivity (W/m · K) | at 200° C. | 0.84 | 2.20 | 0.91 |
|  | at 350° C. | 0.63 | 2.01 | 0.72 |
|  | at 600° C. | 0.53 | 1.61 | 0.61 |
|  | at 800° C. | 0.50 | 1.43 | 0.57 |
|  | at 1000° C. | 0.47 | 1.25 | 0.56 |
| Rate of linear change on heating (%) at 1000° C. |  |  |  |  |
| Average pore size (μm), mercury porosimetry |  |  |  |  |

Pore Size Distribution

Figure 2:
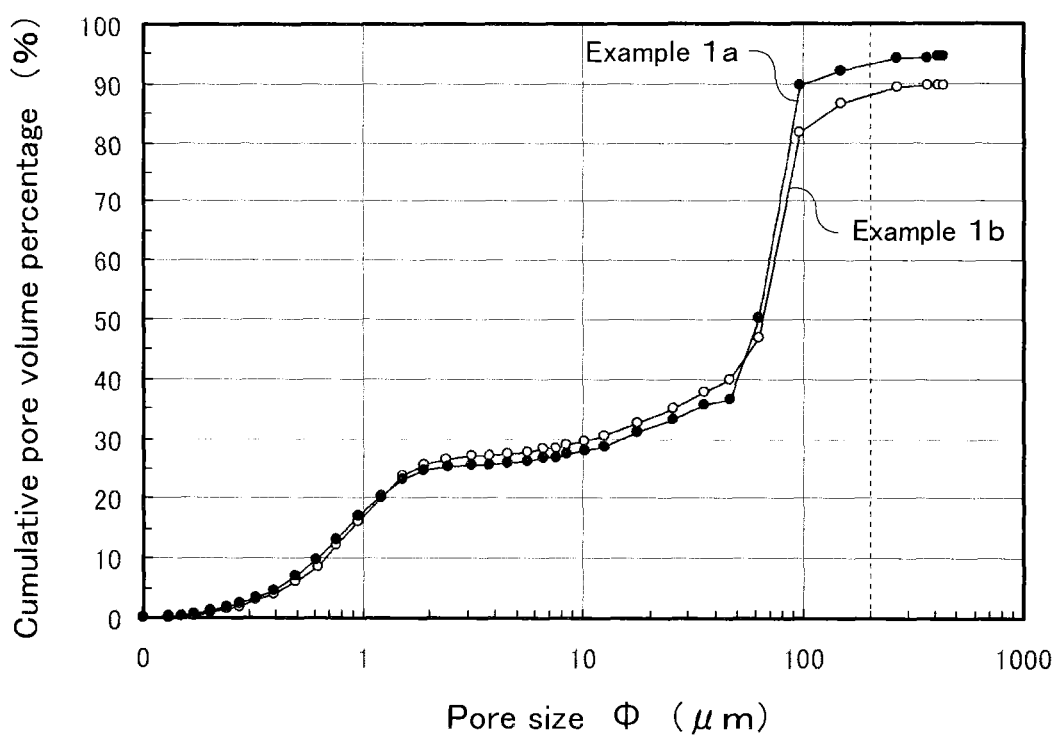
FIG. 2 is a result of the pore size measurement for Example 1 (1a and 1b), and shows a cumulative pore volume distribution curve.

The measurement results of pores of the specimens according to Examples 1a and 1b are shown in FIGS. 1 and 2. FIG. 1 shows the pore size distribution curve when the horizontal axis is taken for pore size φ (μm), and the vertical axis is taken for pore volume (mL/g). Here, the scale of a pore, which can be measured by the mercury porosimetry, is a pore size of about 400 to 500 μm or less. Therefore, in the pore size distribution curve shown in FIG. 1, the measurement values of pores having a pore size exceeds about 400 to 500 μm are not included. As shown in FIG. 1, the peak of the pore size of the specimens according to Examples 1a and 1b is about 100 μm, and there is also a small peak near a pore size of 1 μm.

FIG. 2 shows the cumulative pore volume distribution curve when the horizontal axis is taken for pore size φ (μm), and the vertical axis is taken for cumulative pore volume percentage (%). The cumulative pore volume distribution curve is a curve representing what percentage of the total pore volume the content of pores having a certain pore size φ or less corresponds to. Here, the total pore volume may be calculated from the porosity. As described above, the scale of a pore which can be measured by the mercury porosimetry is a pore size of about 400 to 500 μm or less. Therefore, the total volume of pores measured by the mercury porosimetry is smaller than the total pore volume of the specimen. Accordingly, the end point of the cumulative pore volume distribution curve does not reach 100%, and the value obtained by subtracting the cumulative pore volume percentage of the end point from 100% is the content of pores having a pore size exceeding about 400 to 500 μm.

As shown in FIG. 2, in the specimens of Examples 1a and 1b, pores having a pore size exceeding about 400 to 500 μm are included at about 5 to 10% with respect to the total pore volume. Further, as indicated by an additional line, that is, the broken line in FIG. 2, in any of Examples 1a and 1b, test products of porous thermal insulating firebricks, in which 80% or more volume with respect to the total pore volume consists of pores with a pore size of 200 μm or less, could be prepared. Furthermore, in any of Examples 1a and 1b, test products of porous thermal insulating firebricks, in which 80% or more volume with respect to the total pore volume consists of fine pores with a pore size of 100 μm or less, could be prepared. In terms of homogeneity of a specimen, it is desirable that pores having a large pore size be not included in the specimen and pores having a pore size exceeding 500 μm be included at 10% or less with respect to the total pore volume.

Thermal Conductivity

Figure 3:
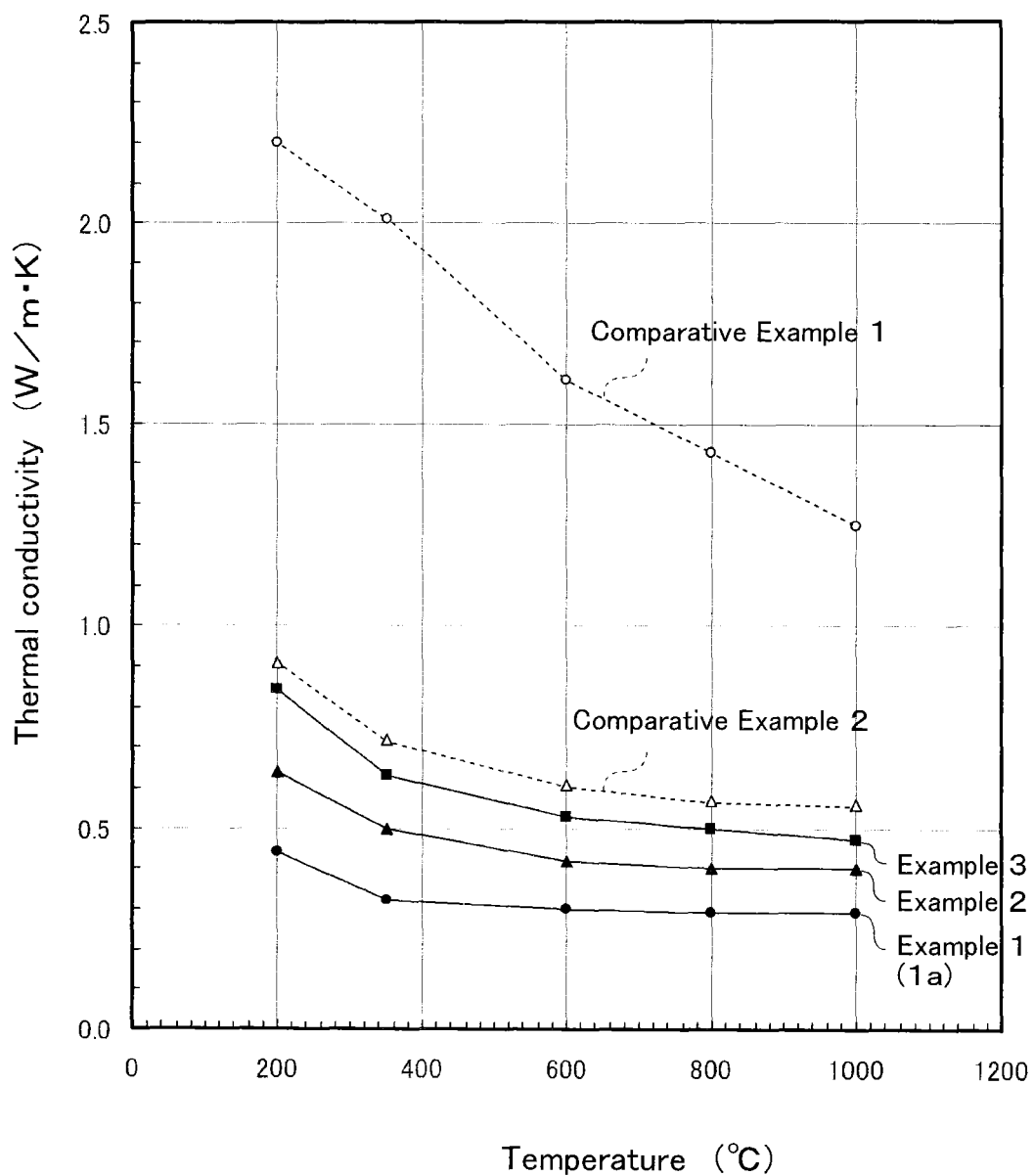
FIG. 3 shows the temperature dependence of thermal conductivity for Examples 1, 2, and 3, and Comparative Examples 1 and 2.

The temperature dependence of the thermal conductivity of the specimens according to Examples 1 (1a), 2, and 3, and Comparative Examples 1 and 2 is shown in FIG. 3. The specimen of Comparative Example 1 with a large bulk specific gravity has a large thermal conductivity and exhibits a tendency in which the thermal conductivity gradually decreases as the temperature increases. The specimen of Comparative Example 2 is a specimen prepared by including pores with a pore size of 1 to 2 mm in the specimen of Comparative Example 1, and has a smaller thermal conductivity compared to the specimen of Comparative Example 1. The thermal conductivity of the specimens of Examples 1 (1a), 2, and 3 increases in this order. Among the respective Examples, the specimen of Example 1 (1a) having the smallest bulk specific gravity and the largest porosity exhibits the best thermal insulating property. In any of Examples and Comparative Examples, a distinctive feature of alumina, in which thermal conductivity gradually decreases as temperature increases, is observed.

In general, it is reasonable to consider as that a thermal conductivity is small as a bulk specific gravity is small (as the porosity is large). However, as shown in FIG. 3, the thermal conductivity of the specimen of Comparative Example 2 (bulk specific gravity: 0.92, porosity: 76.7%) is larger than the thermal conductivity of the specimen of Example 3 (bulk specific gravity: 1.00, porosity: 74.7%). In other words, the specimen of Example 3 is superior in thermal insulating property to the specimen of Comparative Example 2 in spite of having a larger bulk specific gravity and a smaller porosity than the specimen of Comparative Example 2.

From this result, it is found that, when a pore size is set to be small, the thermal insulating property of a thermal insulating firebrick is improved effectively. Accordingly, as in the thermal insulating firebrick of the present Example, by forming a lot of fine pores with a pore size of 200 μm or less in a thermal insulating firebrick, it is possible to obtain a thermal insulating firebrick superior in thermal insulating property when the thermal insulating firebricks having the same composition and porosity are compared with each other.

Example 4

The composition of the specimen for Example 4 is shown in Table 3. The fire resistant powder as the main raw material of the specimen for Example 4 consists of two kinds of high purity alumina powders ($Al_2O_3$) having a purity of 99% or higher that are ceramic powders, andalusite ($Al_2SiO_5$) and kyanite ($Al_2SiO_5$) that are high-alumina natural minerals, and a little amount of alumina cement. When these fire resistant powders are burned, mullite ($3Al_2O_3 \cdot 2SiO_2$) is generated. For auxiliaries, polyvinyl alcohol (PVA) and sodium polyoxyethylene alkyl ether sulfate (AES) are used as foaming components, methyl cellulose (MC) is used as a foam stabilizing component, water glass is used as a viscosity adjusting component, and calcined gypsum is used as a hardening promoting component. The production procedure of the specimen of Example 4 is the same as Example 1 except that a small-sized mixer (capacity: 7 L) is used instead of a whipper (capacity: 60 L) of the above described [Procedure 2] as a foaming apparatus.

Example 5

The specimen of Example 5 is an example having the same composition as the specimen of Example 4 and having a larger pore size than the specimen of Example 4. The production procedure of the specimen of Example 5 is the same as Example 1.

TABLE 3

|  | [Example 4, 5] | Compositional proportion (parts by weight) |
|---|---|---|
| Main raw material | Alumina (1) | 13 |
|  | Alumina (2) | 13 |
|  | Andalusite | 40 |
|  | Kyanite | 30 |
|  | Alumina cement | 4 |
| Auxiliary | 10% Aqueous solution of PVA (saponification degree: 98 to 99 mol %, viscosity: 25 to 30 mPa · s) | 0.6 |
|  | MC (methoxyl group = 27.9%, hydroxypropolycyl group = 6.2%, viscosity: 14,900 mPa · s) | 0.5 |
|  | Calcined gypsum | 1.4 |
|  | Water glass (sodium silicate) No. 3 | 0.08 |
|  | Surfactant (AES) | 0.07 |
| Kneading water |  | 55 |

Remark
Alumina (1): $Al_2O_3$ = 99.6%, Average particle size = 4 μm
Alumina (2): $Al_2O_3$ = 99.3%, 89% passed through 1 μm
Andalusite: $Al_2O_3$ = 60.8%, $SiO_2$ = 38.1%, 200 Mesh (75 μm)
Kyanite: $Al_2O_3$ = 57.5%, $SiO_2$ = 40.3%, 325 Mesh (45 μm)
Alumina cement: $Al_2O_3$ = 80%, CaO = 19%, 325 Mesh (45 μm)

Comparative Example 3

The specimen of Comparative Example 3 uses the same main raw material as the specimens of Examples 4 and 5. In the specimen of Comparative Example 3, as in the specimen of Comparative Example 2, pores are formed inside of the thermal insulating firebrick by adding expanded polystyrene beads (EPS) having a particle size of 1 to 2 mm instead of adding the auxiliary used in the specimens of Examples 4 and 5.

Quality and Properties

The quality and properties of the specimens of the thermal insulating firebricks according to Examples 4 and 5, and Comparative Example 3 prepared in these manners are shown in Table 4. As shown in Table 4, although Examples 4 and 5 are prepared by the same production procedure with the same composition, the bulk specific gravity, porosity, and average pore size of both the specimens are different from each other. In addition, the bulk specific gravity and porosity of Comparative Example 3 are similar to those of Example 5.

TABLE 4

|  |  | Example 4 | Example 5 | Comparative Example 3 |
|---|---|---|---|---|
| Bulk specific gravity |  | 0.56 | 0.52 | 0.51 |
| Porosity (%) |  | 82.8 | 84.0 | 84.3 |
| Compressive strength (MPa) |  | 1.6 | 1.2 | 2.1 |
| Reheat shrinkage (%) at 1500° C. |  | 0.0 | 0.2 | 0.2 |
| Thermal conductivity (W/m · K) | at 200° C. | 0.20 | 0.19 | 0.22 |
|  | at 350° C. | 0.20 | 0.19 | 0.22 |
|  | at 600° C. | 0.23 | 0.20 | 0.26 |
|  | at 800° C. | 0.24 | 0.23 | 0.30 |
|  | at 1000° C. | 0.26 | 0.26 | 0.36 |

TABLE 4-continued

|  | Example 4 | Example 5 | Comparative Example 3 |
|---|---|---|---|
| Rate of linear change on heating (%) at 1000° C. | 0.5 |  |  |
| Average pore size (μm), mercury porosimetry | 10.9 | 20.5 |  |

Pore Size Distribution

Figure 4:
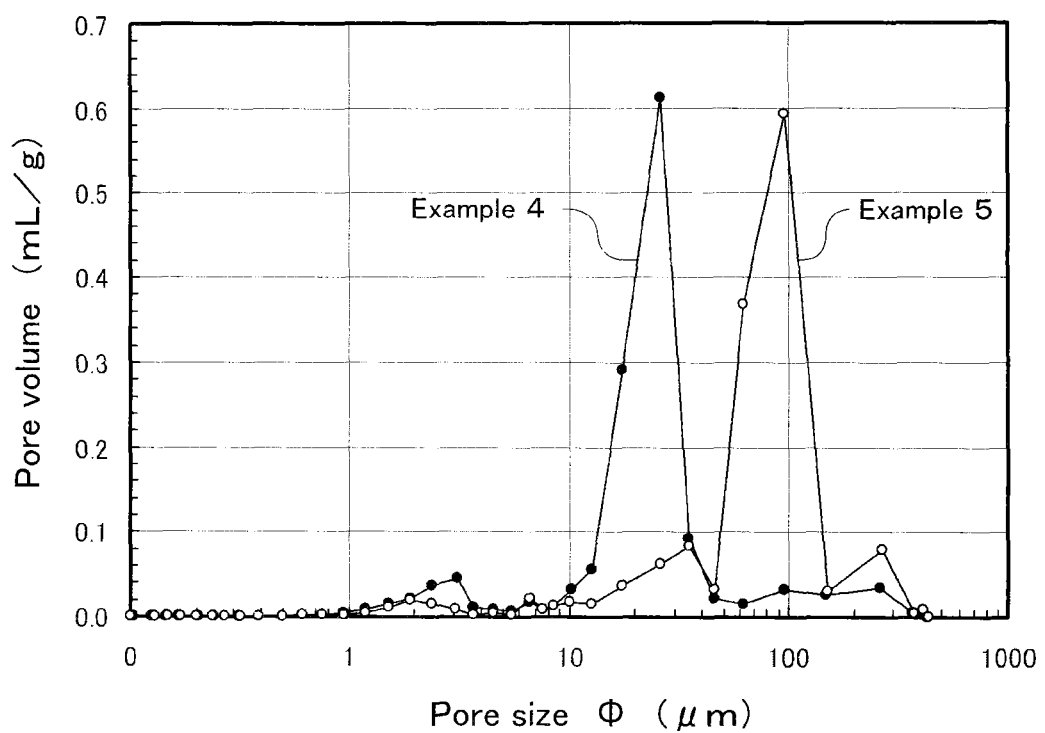
FIG. 4 is a result of the pore size measurement for Examples 4 and 5, and shows a pore-size distribution curve.
Figure 5:
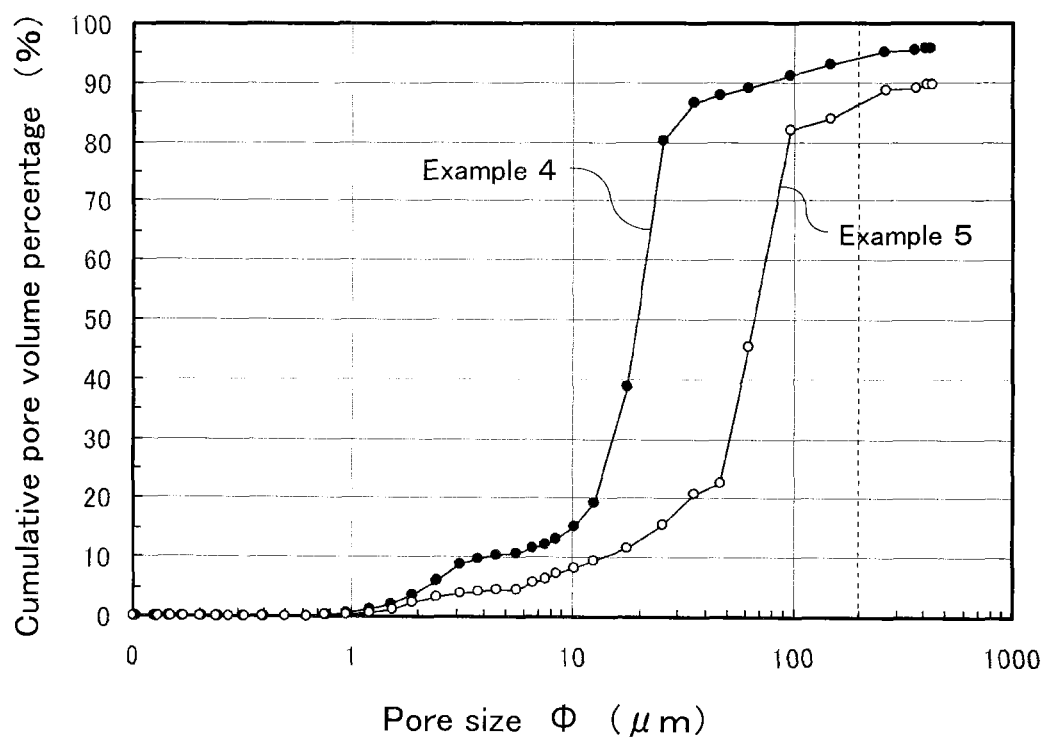
FIG. 5 is a result of the pore size measurement for Examples 4 and 5, and shows a cumulative pore volume distribution curve.

The measurement results of pores of the specimens according to Examples 4 and 5 are shown in FIGS. 4 and 5. As shown in the pore size distribution curve of FIG. 4, from the fact that the peak of the pore size of the specimen according to Example 4 is about 20 μm, and the peak of the pore size of the specimen according to Example 5 is about 100 μm, it is found that the thermal insulating firebricks exhibit different pore size distributions from each other to some extent when different foaming apparatuses are used, even though the thermal insulating firebricks are prepared by the production procedure with the same composition.

As shown in the cumulative pore volume distribution curve of FIG. 5, in the specimens of Examples 4 and 5, pores having a pore size exceeding about 400 to 500 μm are included at about 5 to 10% with respect to the total pore volume as in the specimen of Example 1. Further, as indicated by an additional line, that is, the broken line in FIG. 5, in any of Examples 4 and 5, test products of porous thermal insulating firebricks, in which 80% or more volume with respect to the total pore volume consists of pores with a pore size of 200 μm or less, could be prepared as in Example 1. Furthermore, in any of Examples 4 and 5, test products of porous thermal insulating firebricks, in which 80% or more volume with respect to the total pore volume consists of fine pores with a pore size of 100 μm or less, could be prepared as in Example 1.

Thermal Conductivity

Figure 6:
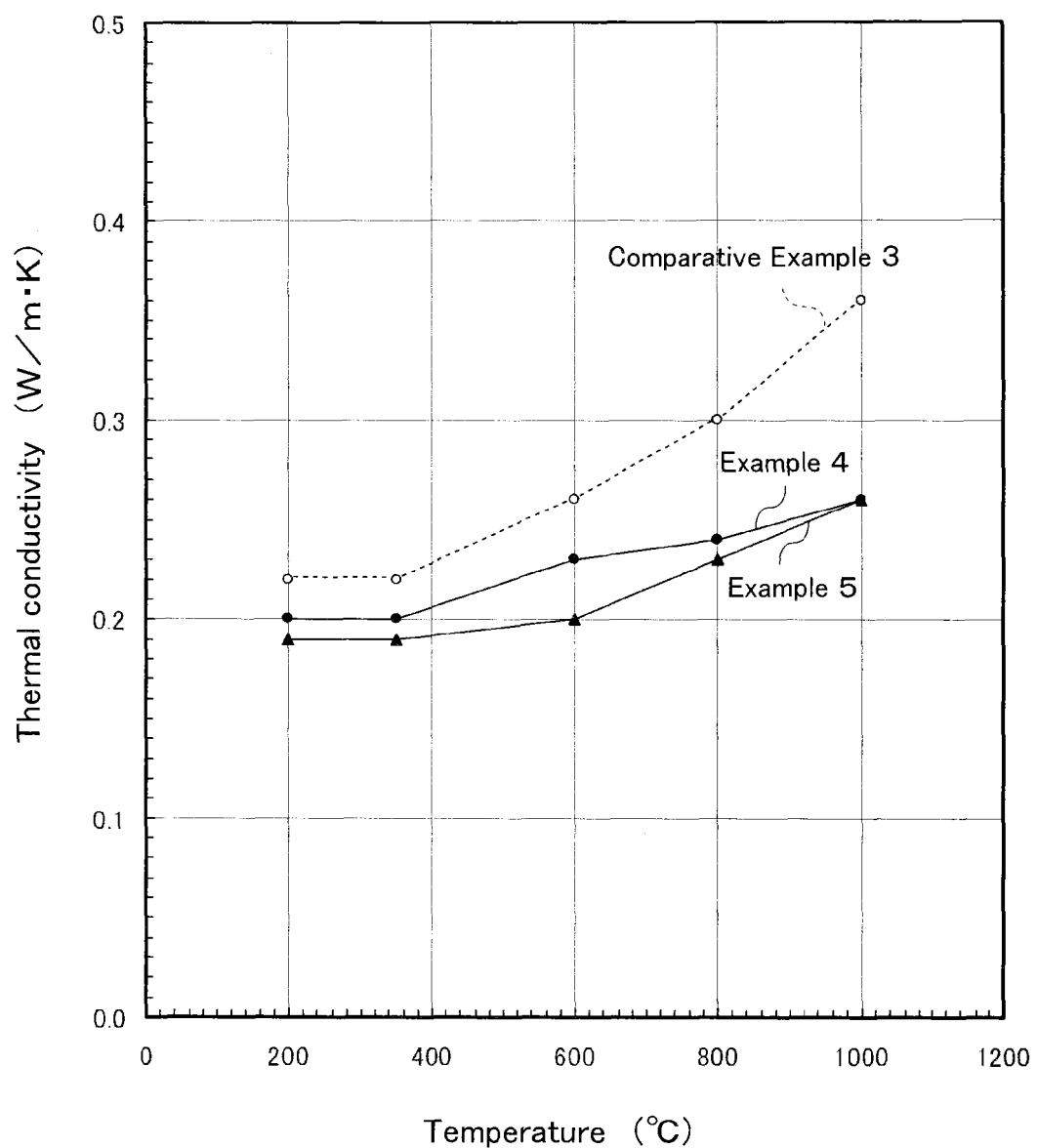
FIG. 6 shows the temperature dependence of thermal conductivity for Examples 4 and 5, and Comparative Example 3.

The temperature dependence of the thermal conductivity of the specimens according to Examples 4 and 5, and Comparative Example 3 is shown in FIG. 6. As shown in FIG. 6, the mullite thermal insulating firebricks of Examples 4 and 5 containing a lot of fine pores with a pore size of 200 μm or less have small thermal conductivity values regardless of the temperature. In addition, increase in thermal conductivity with accompanying increase in temperature is little. In other words, in the mullite thermal insulating firebricks of Examples 4 and 5 and the mullite thermal insulating firebrick of Comparative Example 3 containing pores with a pore size of 1 to 2 mm, the difference in thermal conductivity between the two becomes significant as the temperature increases. Accordingly, the mullite thermal insulating firebricks of Examples 4 and 5 exhibit an ideal thermal conductivity as a thermal insulating firebrick for a high temperature, and exhibit excellent thermal insulating property at a high temperature that is the temperature region for practical use.

Accordingly, even in a mullite thermal insulating firebrick, by forming a lot of fine pores with a pore size of 200 μm or less in a thermal insulating firebrick, it is possible to obtain a thermal insulating firebrick superior in thermal insulating property when the thermal insulating firebricks having the same composition and porosity are compared with each other.

The invention claimed is:
1. A porous thermal insulating firebrick obtained by a process comprising: molding and drying a bubble-compris- ing slurry obtained by foaming a slurry comprising a fire resistant powder having a heat resistant temperature of 1,000° C. or higher and water,
wherein
the thermal insulating firebrick has a porosity of 60% or more,
the thermal insulating firebrick comprises pores having a diameter of from about 10 to about 200 μm, and
80% or more volume with respect to a total pore volume inside of the thermal insulating firebrick consists of pores with a pore size of 200 μm or less.

2. The thermal insulating firebrick according to claim 1, wherein the fire resistant powder comprises a raw material comprising at least one selected from the group consisting of alumina, mullite, andalusite, kyanite, cordierite, spinel, magnesia, and zirconia.

3. The thermal insulating firebrick according to claim 2, wherein
the fire resistant powder is a high purity alumina powder having a purity of 99% or higher, and
the thermal insulating firebrick has a bulk specific gravity of 1.2 or lower.

4. The thermal insulating firebrick according to claim 2, wherein the slurry comprises at least one of alumina cement, hydraulic alumina, and calcined gypsum.

5. The thermal insulating firebrick according to claim 3, wherein the slurry comprises at least one of alumina cement, hydraulic alumina, and calcined gypsum.

6. The thermal insulating firebrick according to claim 1, wherein the thermal insulating firebrick comprises alumina and comprises pores having a diameter of from about 40 to about 200 μm.

7. The thermal insulating firebrick according to claim 1, wherein the thermal insulating firebrick comprises mullite and comprises pores having a diameter of from about 10 to about 40 μm.

8. The thermal insulating firebrick according to claim 1, wherein the thermal insulating firebrick comprises mullite and comprises pores having a diameter of from about 40 to about 200 μm.

* * * * *